United States Patent
Wei et al.

(10) Patent No.: US 11,713,362 B2
(45) Date of Patent: Aug. 1, 2023

(54) DEPOLYMERIZER AND RECYCLED RUBBER

(71) Applicant: INDUSTRIAL TECHNOLOGY RESEARCH INSTITUTE, Hsinchu (TW)

(72) Inventors: Yi-Ting Wei, Zhubei (TW); Jyh-Horng Wu, Kaohsiung (TW); Yao-Zu Wu, Tainan (TW); Ming-Tsong Leu, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 219 days.

(21) Appl. No.: 17/135,344

(22) Filed: Dec. 28, 2020

(65) Prior Publication Data

US 2022/0204656 A1 Jun. 30, 2022

(51) Int. Cl.
*C08C 19/30* (2006.01)
*C08C 19/08* (2006.01)
*C08F 236/14* (2006.01)

(52) U.S. Cl.
CPC .............. *C08C 19/08* (2013.01); *C08C 19/30* (2013.01); *C08F 236/14* (2013.01)

(58) Field of Classification Search
CPC ........ C08C 19/08; C08C 19/30; C08F 236/14
USPC ......................................................... 521/43
See application file for complete search history.

(56) References Cited

U.S. PATENT DOCUMENTS

| | | | |
|---|---|---|---|
| 2,469,529 A | 5/1949 | Tewksbury et al. | |
| 4,440,816 A * | 4/1984 | Uffner ................... | E01C 11/005 428/440 |
| 5,159,123 A * | 10/1992 | Knifton ................... | C07C 29/36 568/852 |
| 7,425,584 B2 | 9/2008 | McFarlane et al. | |
| 8,283,438 B2 | 10/2012 | David et al. | |
| 9,458,303 B1 | 10/2016 | Willing et al. | |
| 10,011,664 B2 | 7/2018 | Obrecht et al. | |
| 2009/0082475 A1 | 3/2009 | Zhang et al. | |
| 2014/0366759 A1 | 12/2014 | Tria et al. | |
| 2014/0370305 A1 | 12/2014 | Tria et al. | |
| 2017/0190806 A1 | 7/2017 | Obrecht et al. | |

FOREIGN PATENT DOCUMENTS

| | | |
|---|---|---|
| CN | 102050960 A | 5/2011 |
| CN | 101759869 B | 6/2011 |
| CN | 101113140 B | 1/2012 |
| CN | 103435842 A | 12/2013 |
| CN | 104761581 A | 7/2015 |
| CN | 105733021 B | 4/2019 |
| GB | 575546 A | 2/1946 |
| TW | 200829613 A | 7/2008 |
| TW | 201414776 A | 4/2014 |
| TW | 1717105 B | 1/2021 |
| WO | WO 01/23464 A1 | 4/2001 |
| WO | WO 2014/084727 A1 | 6/2014 |

OTHER PUBLICATIONS

Ghaisas et al., "Blends of Plasticized Poly(vinyl chloride) and Waste Flexible Poly(vinyl chloride) with Waste Nitrile Rubber Powder," Journal of Applied Polymer Science, vol. 91, 2004, pp. 1552-1558 (8 pages total).
Johnson et al., "Product recovery decisions within the context of Extended Producer Responsiblity," Journal of Engineering and Technology Management, vol. 34, 2014 (published online Dec. 12, 2013), pp. 9-28.
Masaki et al., "Devulcanization of Nitrile Butadiene Rubber in Nitrobenzene," Journal of Applied Polymer Science, vol. 91, 2004, pp. 3342-3353.
Oecd, "Extended Producer Responsibility: Updated guidance for efficient waste management," OECD Policy Highlights—Extended Producer Responsibility, Sep. 2016, pp. 1-6 (8 pages total).
Salzman, "Sustainable Consumption and the Law," Environmental Law, vol. 27, pp. 1243-1294.
Schaeffer, Jr., et al., "Data for General, Organic, and Physical Chemistry," 1989, 63 pages.
Tipanna et al., "Composites of Waste, Ground Rubber Particles and Poly(vinyl chloride)," Rubber Chemistry and Technology, vol. 70, No. 5, 1997, pp. 815-819.
Viglianisi et al., "Chain Breaking Antioxidant Activity of Heavy (S, Se, Te) Chalcogens Substituted Polyphenols," Antioxidants, vol. 8, No. 10, 487, 2019, pp. 1-22.
Taiwanese Office Action and Search Report for Taiwanese Application No. 110100391, dated Mar. 21, 2022.

* cited by examiner

*Primary Examiner* — Terressa Boykin
(74) *Attorney, Agent, or Firm* — Birch, Stewart, Kolasch & Birch, LLP

(57) ABSTRACT

A depolymerizer is formed by grafting thiol groups on parts of the double bonds of a polymer of linear conjugated diene monomer. The linear conjugated diene monomer can be 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, or 4,5-diethyl-1,3-octadiene. The depolymerizer has a weight average molecular weight of 1000 to 400000.

5 Claims, No Drawings

DEPOLYMERIZER AND RECYCLED RUBBER

TECHNICAL FIELD

The technical field relates to recycled rubber, and in particular it relates to a depolymerizer for recycled rubber.

BACKGROUND

The current methods of processing waste rubber include recycling and reproduction. However, existing methods of recycling and reproduction have poor quality, bad environment of the reproduction factory, and high energy consumption. Accordingly, a depolymerizer should be developed that can reduce the energy needed for the recycling process, enhance the rubber's reproduction quality, and increase the applicability of depolymerized rubber.

SUMMARY

One embodiment of the disclosure provides a depolymerizer being formed by grafting thiol groups on parts of double bonds of a polymer of a linear conjugated diene monomer, wherein the linear conjugated diene monomer is 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, or 4,5-diethyl-1,3-octadiene.

In some embodiments, the depolymerizer is poly(1,3-butadiene) having thiol groups grafted on parts of the double bonds, and the depolymerizer has a chemical structure of

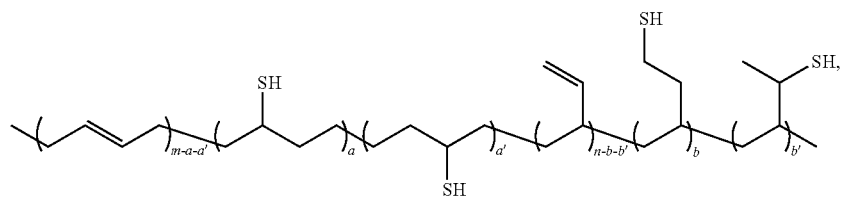

wherein $(a+a'+b+b'):(m+n)=0.01:1$ to $0.67:1$.

In some embodiments, the depolymerizer has a weight average molecular weight of 1000 to 400000.

One embodiment of the disclosure provides a recycled rubber, being formed by depolymerizing 100 parts by weight of rubber using 0.5 to 10 parts by weight of a depolymerizer, wherein the depolymerizer is formed by grafting thiol groups on parts of double bonds of a polymer of a linear conjugated diene monomer, wherein the linear conjugated diene monomer is 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, or 4,5-diethyl-1,3-octadiene.

In some embodiments, the depolymerizer is poly(1,3-butadiene) having thiol groups grafted on parts of the double bonds, and the depolymerizer has a chemical structure of

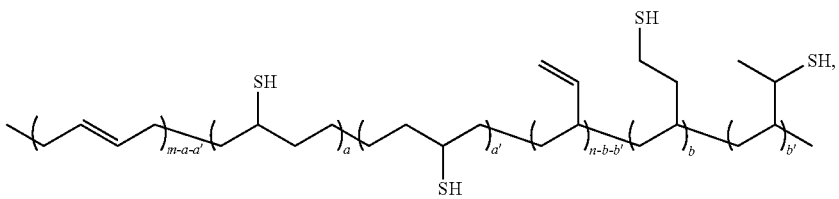

wherein $(a+a'+b+b'):(m+n)=0.01:1$ to $0.67:1$.

In some embodiments, the rubber includes poly(cis-1,3-butadiene) rubber, polystyrene-butadiene rubber, nitrile rubber, buna rubber, ethylene propylene rubber, butyl rubber, or a combination thereof.

In some embodiments, the depolymerizer has a weight average molecular weight of 1000 to 400000.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a depolymerizer being formed by grafting thiol groups on parts of double bonds of a polymer of a linear conjugated diene monomer. In some embodiments, the linear conjugated diene monomer is 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, or 4,5-diethyl-1,3-octadiene. Take poly(1,3-butadine), the polymer of the linear conjugated diene monomer, as an example, the poly(1,3-butadine) is firstly reacted with thioacetic acid, thereby grafting thioacetic acid on parts of double bonds of the poly(1,3-butadine).

In the above formula, $(a+a'+b+b'):(m+n)=0.01:1$ to $0.67:1$, and the ratio is the ratio of the thiol groups grafted on double bonds of the poly(1,3-butadiene). If the ratio of the thiol groups grafted on double bonds is too low, the depolymerization effect for the vulcanized rubber will be poor, and the mechanical properties of the recycled rubber will be lowered. If the ratio of the thiol groups grafted on double bonds is high, the mechanical properties of the recycled rubber will be better. However, the maximum ratio (0.67:1) is limited to conventional equipment and reaction conditions. In the

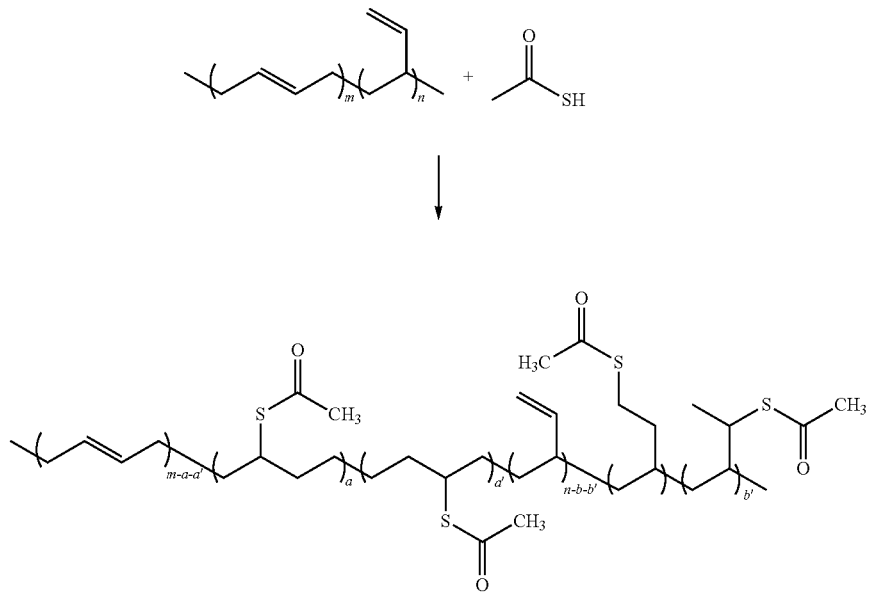

Subsequently, alkaline such as sodium hydroxide aqueous solution can be adopted to deprotect the thioacetic acid grafted on the double bonds, thereby forming the thiol groups (grafted on the double bonds).

above formula, the ratio of m and n depends on the polymerization mechanism (e.g. 1,4-addition or 1,2-addition), which can be determined by the copolymerization factors in practice.

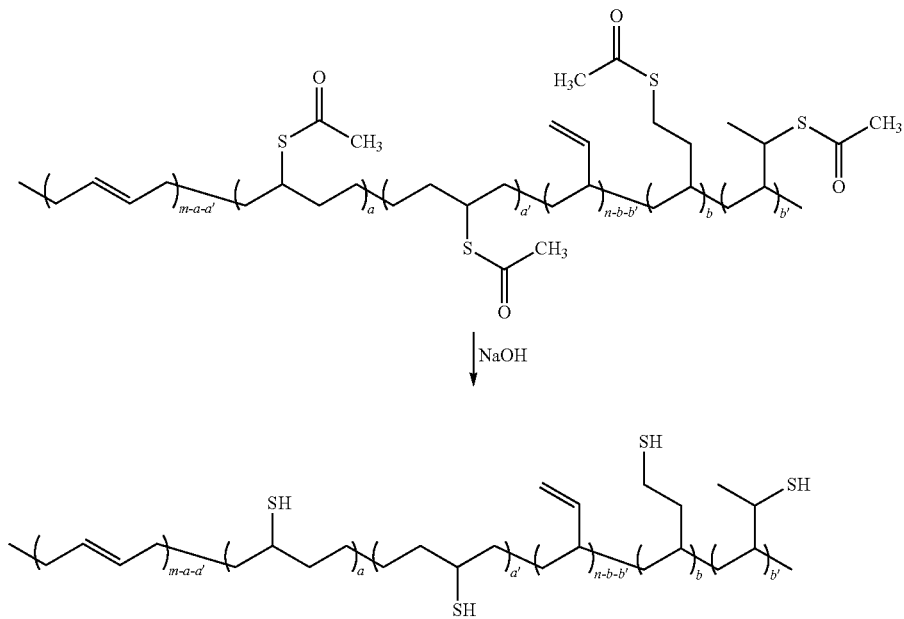

Take polyisoprene as an example, the polyisoprene is firstly reacted with thioacetic acid, thereby grafting thioacetic acid on parts of double bonds of the polyisoprene.

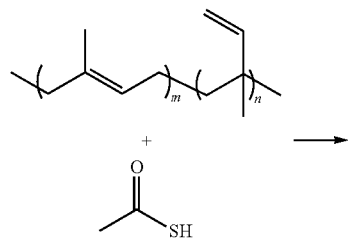

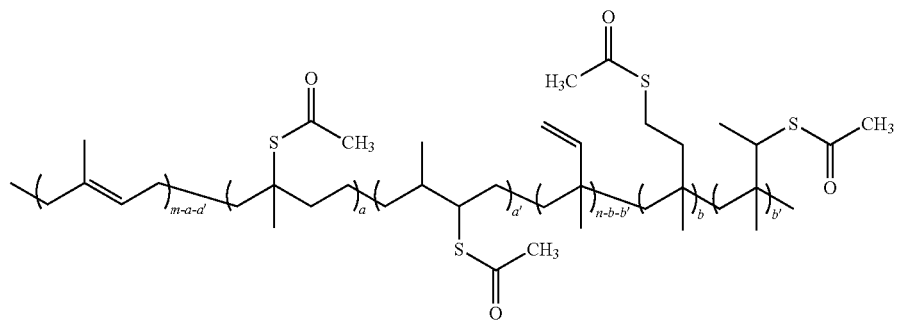

Subsequently, alkaline such as sodium hydroxide aqueous solution can be adopted to deprotect the thioacetic acid grafted on the double bonds, thereby forming the thiol groups (grafted on the double bonds). In the following formula, m, n, a, a', b, and b' are defined as above.

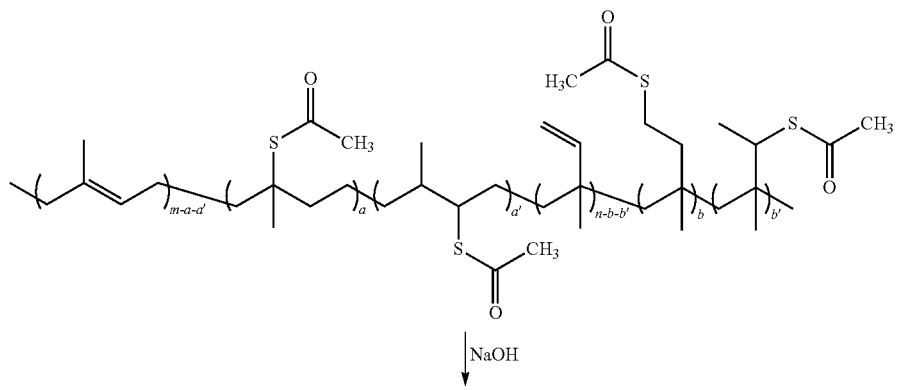

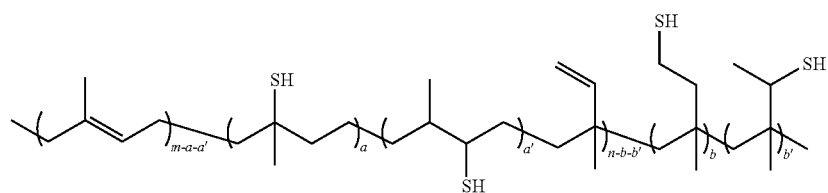

Take poly(1,3-pentadiene) as an example, the poly(1,3-pentadiene) is firstly reacted with thioacetic acid, thereby grafting thioacetic acid on parts of double bonds of the poly(1,3-pentadiene).

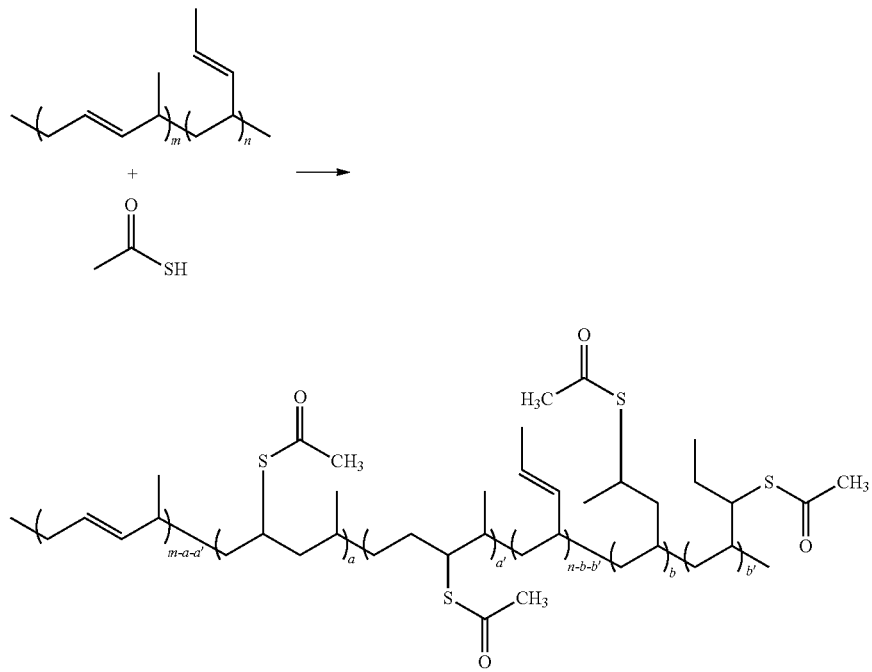

Subsequently, alkaline such as sodium hydroxide aqueous solution can be adopted to deprotect the thioacetic acid grafted on the double bonds, thereby forming the thiol groups (grafted on the double bonds). In the following formula, m, n, a, a', b, and b' are defined as above.

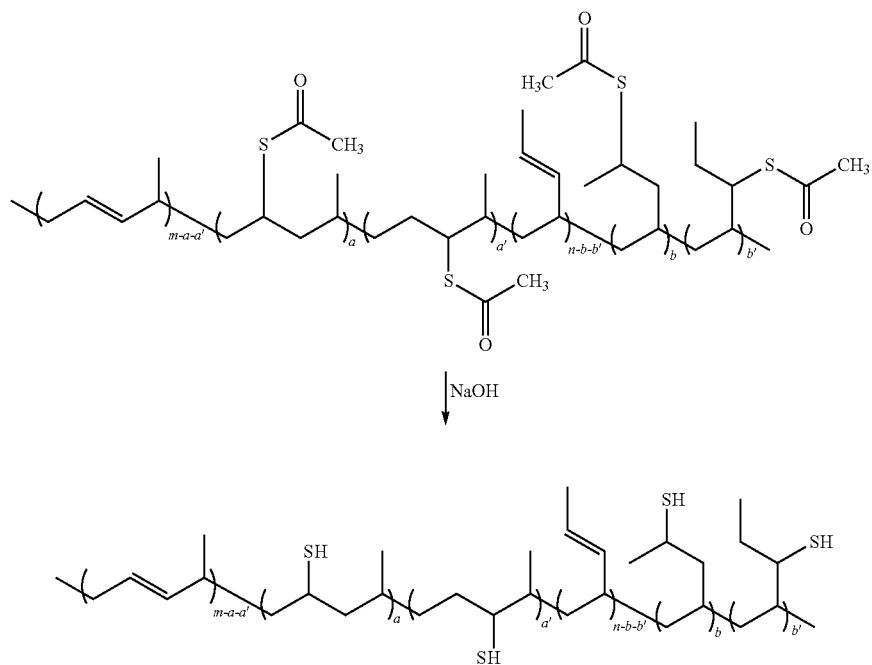

Take poly(2,3-dimethyl-1,3-butadiene) as an example, the poly(2,3-dimethyl-1,3-butadiene) is firstly reacted with thioacetic acid, thereby grafting thioacetic acid on parts of double bonds of the poly(2,3-dimethyl-1,3-butadiene).

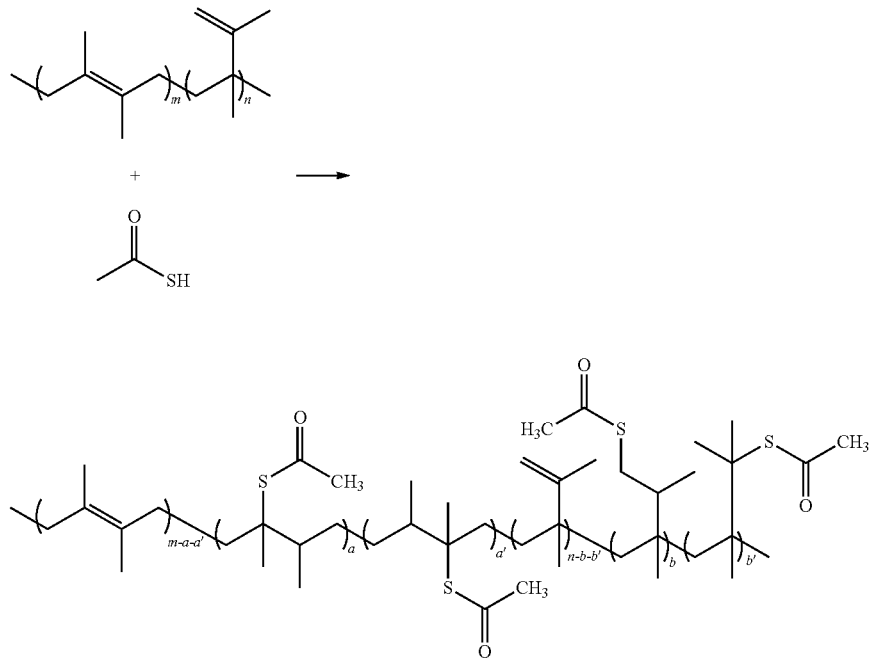

Subsequently, alkaline such as sodium hydroxide aqueous solution can be adopted to deprotect the thioacetic acid grafted on the double bonds, thereby forming the thiol groups (grafted on the double bonds). In the following formula, m, n, a, a', b, and b' are defined as above.

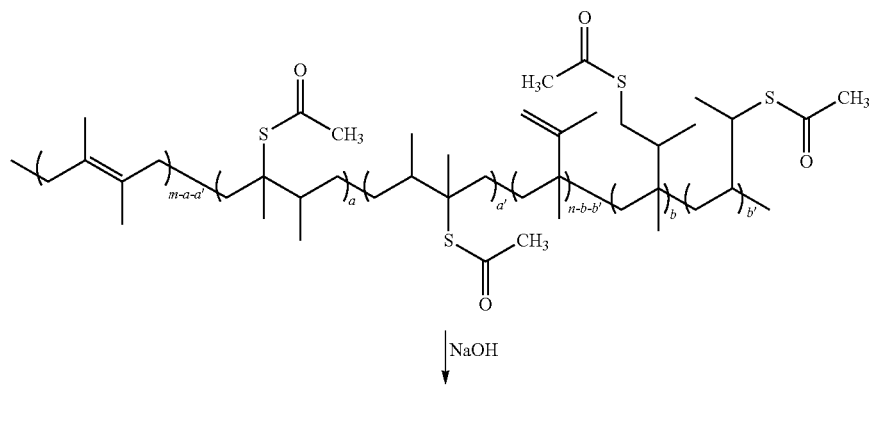

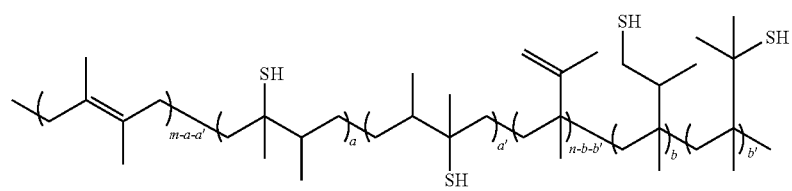

Take poly(2-methyl-1,3-pentadiene) as an example, the poly(2-methyl-1,3-pentadiene) is firstly reacted with thioacetic acid, thereby grafting thioacetic acid on parts of double bonds of the poly(2-methyl-1,3-pentadiene).

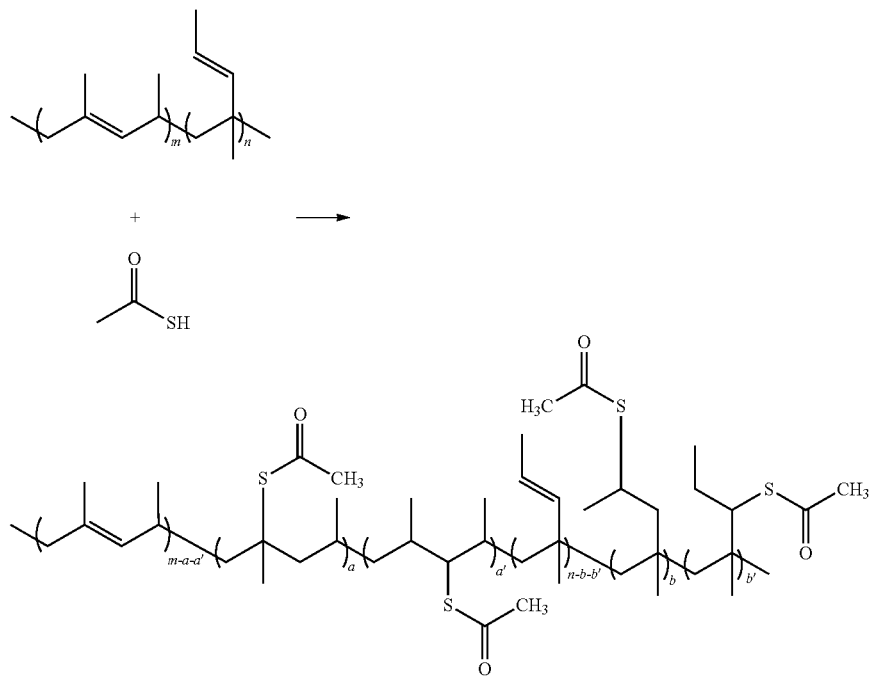

Subsequently, alkaline such as sodium hydroxide aqueous solution can be adopted to deprotect the thioacetic acid grafted on the double bonds, thereby forming the thiol groups (grafted on the double bonds). In the following formula, m, n, a, a', b, and b' are defined as above.

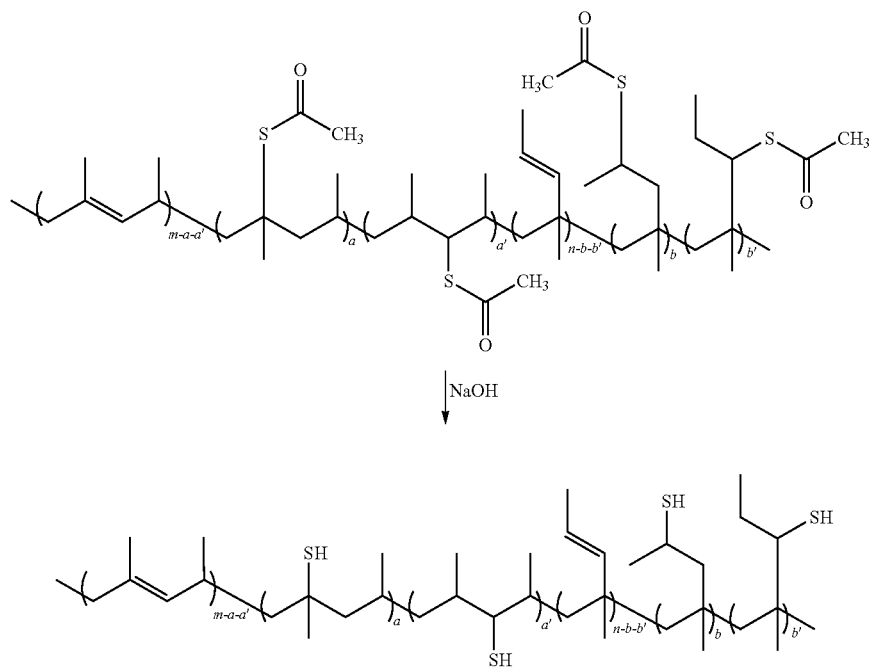

Take poly(2,3-dimethyl-1,3-pentadiene) as an example, the poly(2,3-dimethyl-1,3-pentadiene) is firstly reacted with thioacetic acid, thereby grafting thioacetic acid on parts of double bonds of the poly(2,3-dimethyl-1,3-pentadiene).

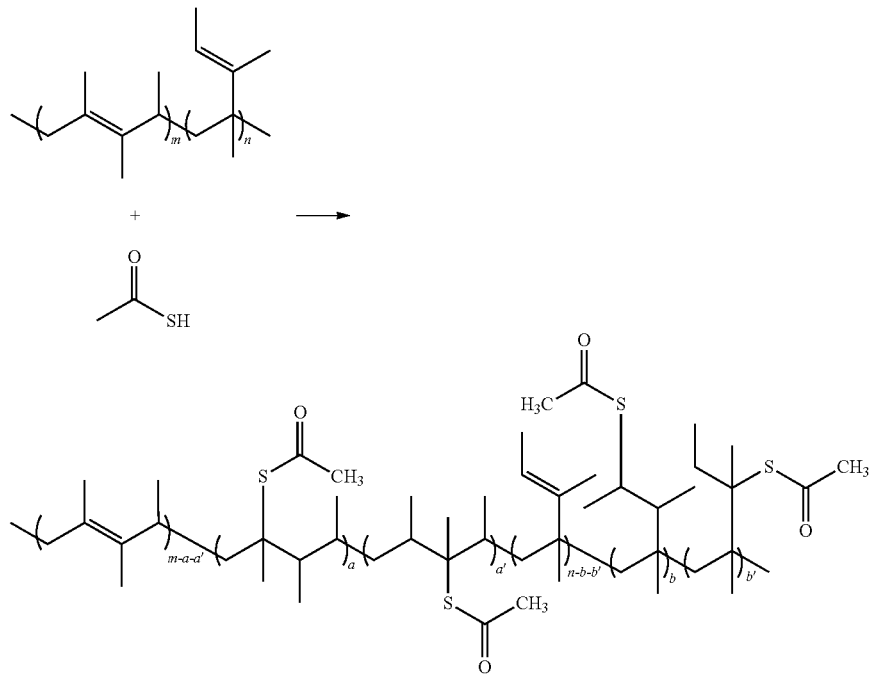

Subsequently, alkaline such as sodium hydroxide aqueous solution can be adopted to deprotect the thioacetic acid grafted on the double bonds, thereby forming the thiol groups (grafted on the double bonds). In the following formula, m, n, a, a', b, and b' are defined as above.

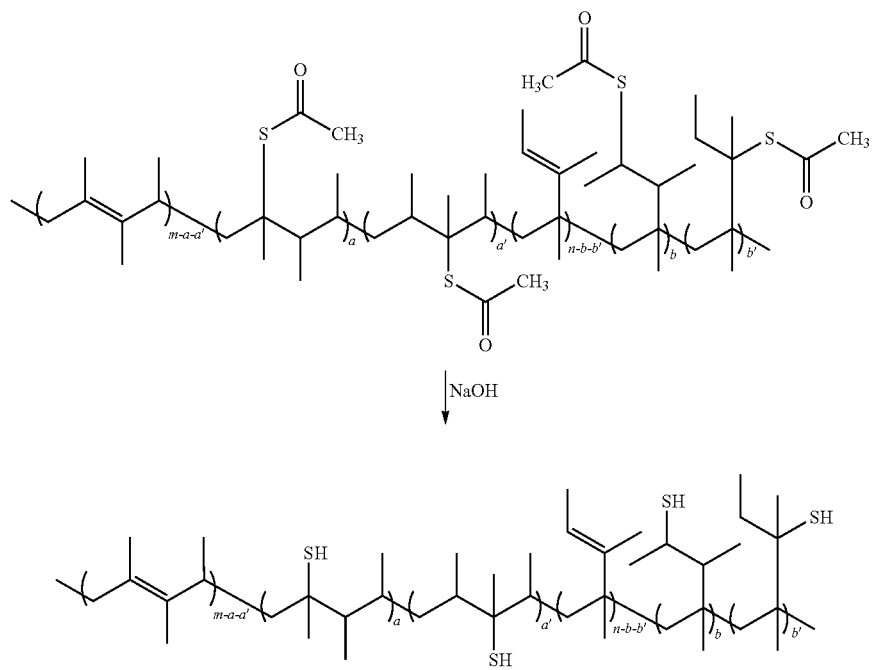

Take poly(2-phenyl-1,3-butadiene) as an example, the poly(2-phenyl-1,3-butadiene) is firstly reacted with thioacetic acid, thereby grafting thioacetic acid on parts of double bonds of the poly(2-phenyl-1,3-butadiene).

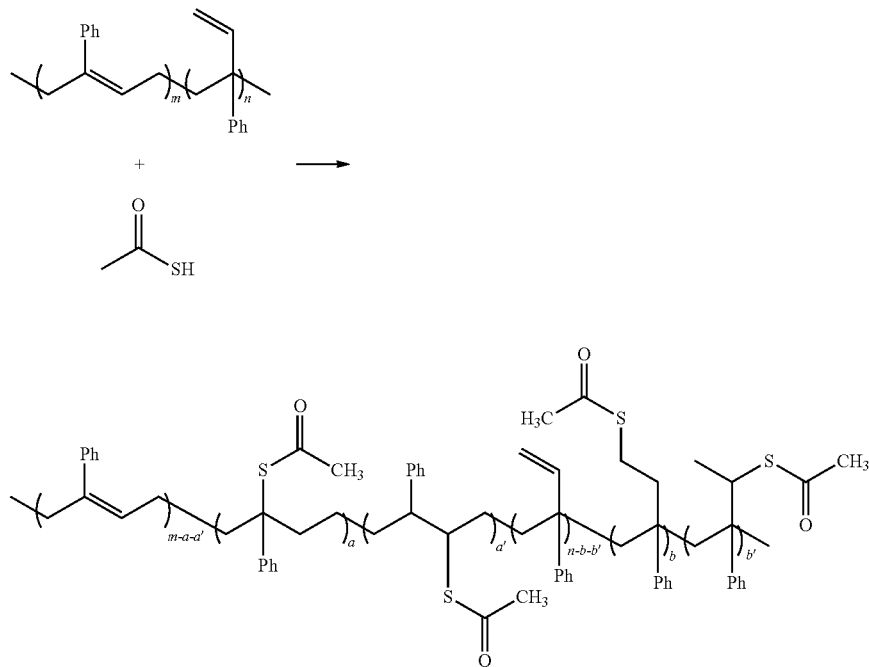

Subsequently, alkaline such as sodium hydroxide aqueous solution can be adopted to deprotect the thioacetic acid grafted on the double bonds, thereby forming the thiol groups (grafted on the double bonds). In the following formula, m, n, a, a', b, and b' are defined as above.

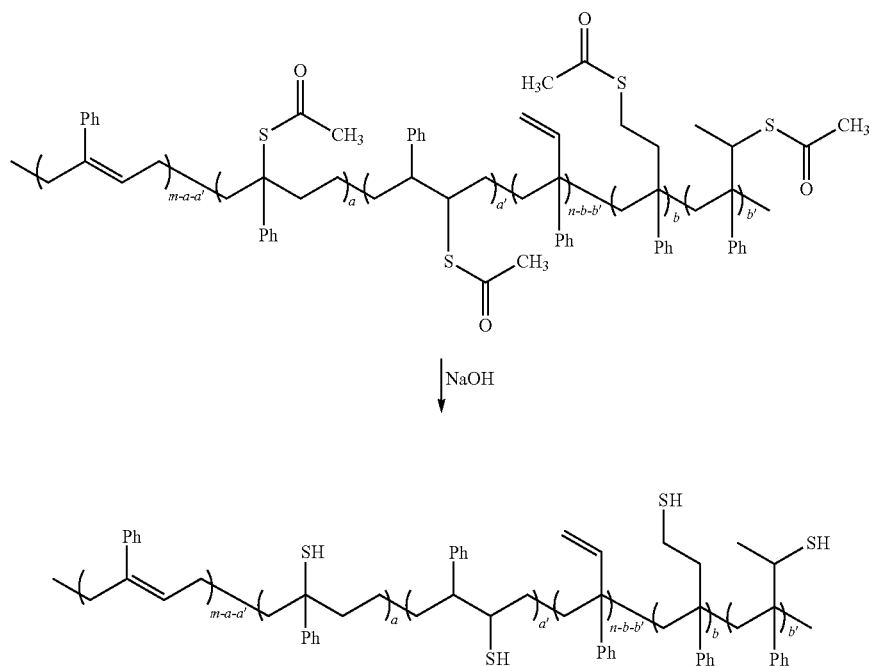

Take poly(4,5-diethyl-1,3-octadiene) as an example, the poly(4,5-diethyl-1,3-octadiene) is firstly reacted with thioacetic acid, thereby grafting thioacetic acid on parts of double bonds of the poly(4,5-diethyl-1,3-octadiene).

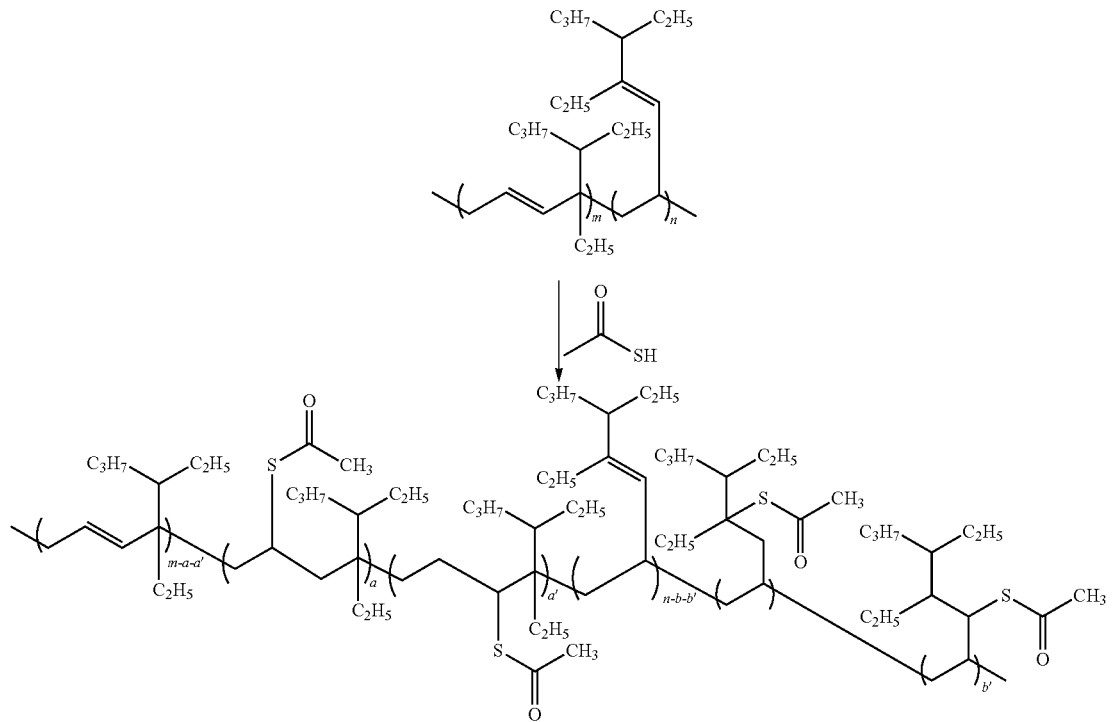

Subsequently, alkaline such as sodium hydroxide aqueous solution can be adopted to deprotect the thioacetic acid grafted on the double bonds, thereby forming the thiol groups (grafted on the double bonds). In the following formula, m, n, a, a', b, and b' are defined as above.

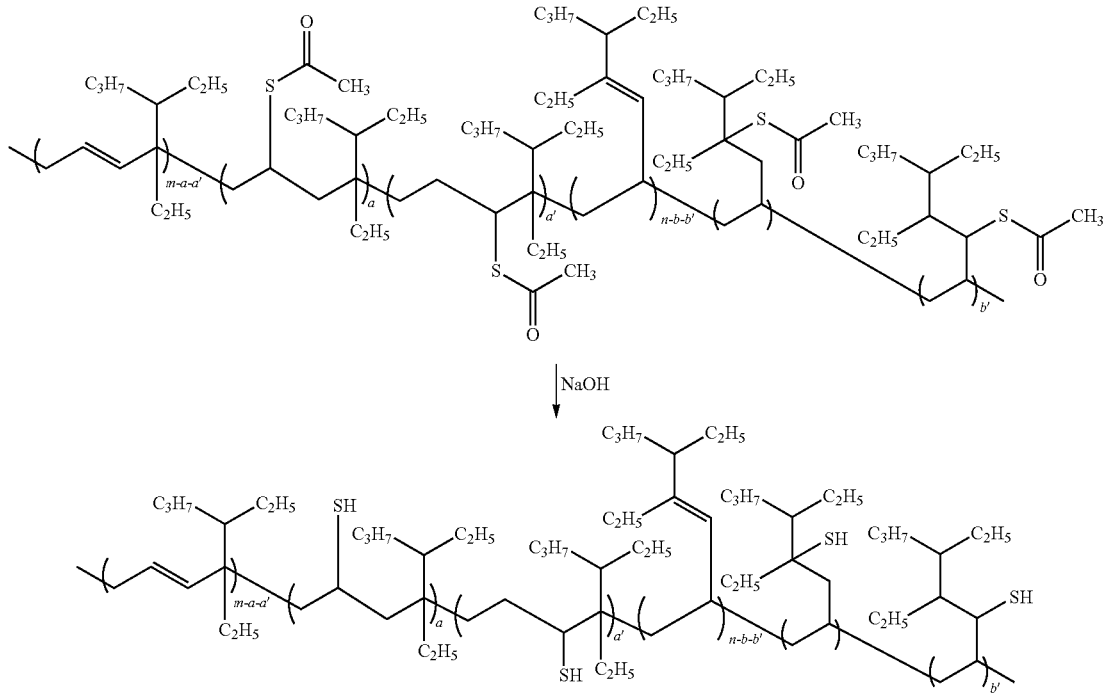

It should be understood that the thioacetic acid can be replaced with thiobenzoic acid (Ph-C(=O)—SH) or the like, and the sodium hydroxide can be replaced with potassium hydroxide or the like.

In some embodiments, the depolymerizer has a weight average molecular weight of 1000 to 400000. If the weight average molecular weight of the depolymerizer is too low, the depolymerizer will be easily cracked and volatilized to produce a lot of stench. If the weight average molecular weight of the depolymerizer is too high, the recycled rubber will have a poor depolymerization effect and a poor mechanical strength.

One embodiment of the disclosure provides a recycled rubber, being formed by depolymerizing 100 parts by weight of rubber and 0.5 to 10 parts by weight of the described depolymerizer. If the depolymerizer amount is too low, the depolymerization effect cannot be improved. High depolymerizer amount may result in an excellent depolymerization quality. If the depolymerizer amount is too high, the depolymerization effect cannot be increased more. For example, the waste rubber and the depolymerizer can be mixed by a known method in this field, such as thermo mechanical mixing. The thermo mechanical mixing steps often include mechanical processing in a mixer or an extruder at a depolymerization reaction temperature for a proper time length. The proper time length of the thermo mechanical processing depends on the operation conditions, component volume, and component properties. For example, the thermo mechanical processing period can be 1 minute to 60 minutes. In one embodiment, the depolymerization reaction temperature is 120° C. to 350° C. If the depolymerization reaction temperature is too low, the depolymerization period will be extended or even fail to depolymerize the rubber. If the depolymerization reaction temperature is too high, it will over depolymerize to degrade the properties of the recycled rubber (e.g. lowering the tensile strength and the elongation rate).

In some embodiments, the rubber includes poly(cis-1,3-butadiene) rubber, polystyrene-butadiene rubber, nitrile rubber, buna rubber, ethylene propylene rubber, butyl rubber, or a combination thereof.

In some embodiments, the recycled rubber can be further vulcanized. For example, sulfur or another vulcanizer can be added to vulcanize the recycled rubber on the basis of the requirements, thereby further modifying the properties of the recycled rubber to achieve the required specifications of the product. In addition, the recycled rubber and the fresh rubber can be mixed to use.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

Synthesis Example 1

30 g of poly(1,3-butadiene) (TAIPOL BRO150L, 98%-cis, commercially available from TSRC corporation) was added to 300 mL of toluene, and then heated to 80° C. to reflux and stir for 24 hours to completely dissolve the poly(1,3-butadiene). 8.0 mL of thioacetic acid was added to the poly(1,3-butadiene) solution, and then stirred and reflux at 80° C. to react for 48 hours. After the reaction finished, the solution color was changed from color-less to yellow. The reaction is shown below:

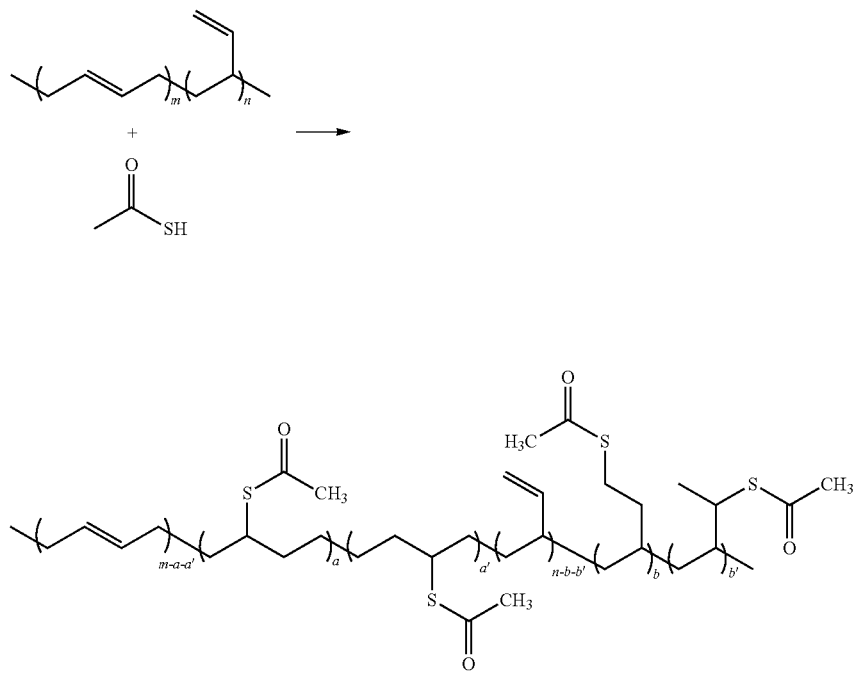

In the above formula, m:n is about 98:2. (a+a'+b+b'):(m+n) is about 0.5:1, which is the ratio of the thioacetic acid grafted onto the double bonds of the poly(1,3-butadiene) (calculated from the $^1$H NMR spectrum).

Subsequently, 50 mL of NaOH aqueous solution was added to the above solution, and then reflux at 80° C. for 24 hours. The solution color was changed from yellow to white. The reaction is shown below:

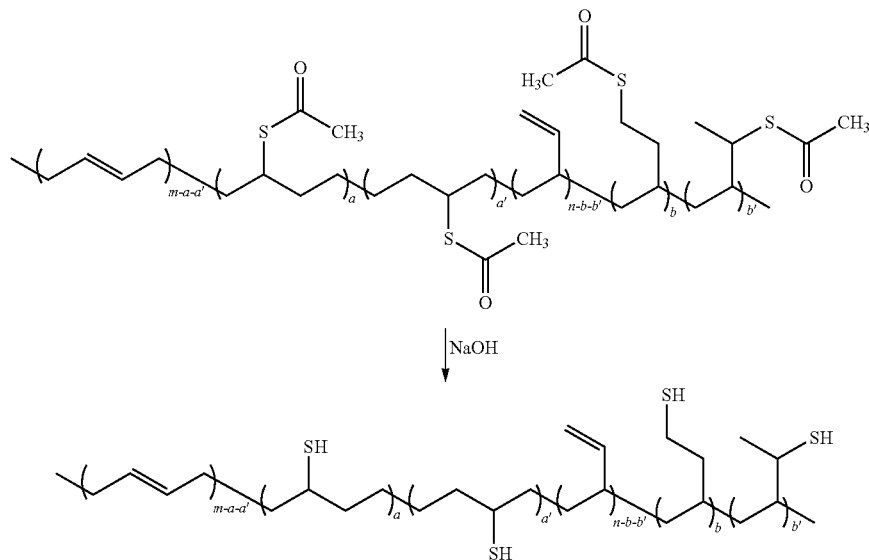

The reaction is so-called de-protection reaction. After the reaction, the poly(1,3-butadiene) having thiol groups grafted on parts of the double bonds could be obtained.

The reaction result was then poured into 600 mL of de-ionized water to stir, then neutralized (e.g. pH=7) by 1M HCl, and then stirred for 1 hour. The above solution was extracted by de-ionized water, and the organic phase of the extraction was collected. Most of the solvent of the organic phase was removed by rotator pump. The concentrated solution was stood in hood for 72 hours, and then put into a vacuum oven to be vacuumed and baked at 50° C. for 72 hours, thereby obtaining a white yellow bulk product. The white yellow bulk product was cracked to obtain white yellow powder. The product was identified by NMR to verify the ratio of thiol group grafted onto the double bonds of the poly(1,3-butadiene) (e.g. (a+a'+b+b'):(m+n) was about 0.5:1.

Example 1-1

100 g of nitrile rubber formula for roller (commercially available from Chunfa Hitech Industrial Co., Ltd., free of PVC, identified by IR) was hot-pressed and vulcanized at 150° C. for 20 minutes by a hot press machine to form a sheet. The vulcanized sheet was analyzed to measure its tensile strength (9.54 MPa) and elongation ratio (480%).

Example 1-2

120 g of nitrile rubber formula for roller (commercially available from Chunfa Hitech Industrial Co., Ltd., free of PVC, identified by IR) was hot-pressed and vulcanized at 150° C. for 20 minutes by a hot press machine to obtain a sheet. The sheet was cracked to obtain scraps of waste nitrile rubber with a diameter of about 2 cm. 40 g of the waste nitrile rubber and 3 phr of the depolymerizer (product of Synthesis Example 1) were added into a plastometer (Plasti-corder PL2000) for being depolymerized at 210° C. and 70 rpm for 15 minutes to obtain a recycled rubber. The depolymerization was repeated 3 times to obtain about 120 g of the recycled rubber. The recycled rubber was refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (3.91 MPa) and elongation rate (248%).

Example 1-3

120 g of nitrile rubber formula for roller (commercially available from Chunfa Hitech Industrial Co., Ltd., free of PVC, identified by IR) was hot-pressed and vulcanized at 150° C. for 20 minutes by a hot press machine to obtain a sheet. The sheet was cracked to obtain scraps of waste nitrile rubber with a diameter of about 2 cm. 40 g of the waste nitrile rubber and 3 phr of the AK79 (Aktiplast, commercially available from RheinChemie) were added into a plastometer (Plasti-corder PL2000) for being depolymerized at 210° C. and 70 rpm for 15 minutes to obtain a recycled rubber. The depolymerization was repeated 3 times to obtain about 120 g of the recycled rubber. The recycled rubber was refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (1.56 MPa) and elongation rate (91%).

Example 1-4

120 g of nitrile rubber formula for roller (commercially available from Chunfa Hitech Industrial Co., Ltd., free of PVC, identified by IR) was hot-pressed and vulcanized at 150° C. for 20 minutes by a hot press machine to obtain a sheet. The sheet was cracked to obtain scraps of waste nitrile rubber with a diameter of about 2 cm. 40 g of the waste nitrile rubber and 3 phr of the PiTong 22 (commercially available from commercially available from ShunLi) were added into a plastometer (Plasti-corder PL2000) for being depolymerized at 210° C. and 70 rpm for 15 minutes to obtain a recycled rubber. The depolymerization was repeated 3 times to obtain about 120 g of the recycled rubber. The recycled rubber was refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (3.03 MPa) and elongation rate (177%).

TABLE 1

| | Mechanical strength | | Compared to fresh rubber | |
|---|---|---|---|---|
| | Tensile strength (MPa) | Elongation rate (%) | Tensile strength % | Elongation rate % |
| Example 1-1 (Fresh rubber) | 9.54 | 480 | 100% | 100% |
| Example 1-2 (Depolymerizer of Synthesis Example 1) | 3.9 | 248 | 41% | 52% |
| Example 1-3 (AK79) | 1.56 | 91 | 16% | 19% |
| Example 1-4 (PiTong 22) | 3.03 | 177 | 32% | 37% |

Accordingly, the recycled rubber formed by depolymerizing the waste nitrile rubber with the depolymerizer of Synthesis Example 1 had a mechanical strength being about 50% of that of the fresh rubber. The recycled rubber formed by depolymerizing the waste nitrile rubber with the commercially available depolymerizer had a mechanical strength being 20% to 40% of that of the fresh rubber.

Example 2-1

120 g of nitrile rubber formula for roller (commercially available from Chunfa Hitech Industrial Co., Ltd., free of PVC, identified by IR) was hot-pressed and vulcanized at 150° C. for 20 minutes by a hot press machine to obtain a sheet. The sheet was cracked to obtain scraps of waste nitrile rubber with a diameter of about 2 cm. 40 g of the waste nitrile rubber and 0.5 phr of the depolymerizer (product of Synthesis Example 1) were added into a plastometer (Plasti-corder PL2000) for being depolymerized at 210° C. and 70 rpm for 15 minutes to obtain a recycled rubber. The depolymerization was repeated 3 times to obtain about 120 g of the recycled rubber. The recycled rubber was refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (3.05 MPa) and elongation rate (186%).

Example 2-2

120 g of nitrile rubber formula for roller (commercially available from Chunfa Hitech Industrial Co., Ltd., free of PVC, identified by IR) was hot-pressed and vulcanized at 150° C. for 20 minutes by a hot press machine to obtain a sheet. The sheet was cracked to obtain scraps of waste nitrile rubber with a diameter of about 2 cm. 40 g of the waste nitrile rubber and 1 phr of the depolymerizer (product of Synthesis Example 1) were added into a plastometer (Plasti-corder PL2000) for being depolymerized at 210° C. and 70 rpm for 15 minutes to obtain a recycled rubber. The depolymerization was repeated 3 times to obtain about 120 g of the recycled rubber. The recycled rubber was refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (3.26 MPa) and elongation rate (217%).

Example 2-3

120 g of nitrile rubber formula for roller (commercially available from Chunfa Hitech Industrial Co., Ltd., free of PVC, identified by IR) was hot-pressed and vulcanized at 150° C. for 20 minutes by a hot press machine to obtain a sheet. The sheet was cracked to obtain scraps of waste nitrile rubber with a diameter of about 2 cm. 40 g of the waste nitrile rubber and 2 phr of the depolymerizer (product of Synthesis Example 1) were added into a plastometer (Plasti-corder PL2000) for being depolymerized at 210° C. and 70 rpm for 15 minutes to obtain a recycled rubber. The depolymerization was repeated 3 times to obtain about 120 g of the recycled rubber. The recycled rubber was refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (3.35 MPa) and elongation rate (213%).

Example 2-4

120 g of nitrile rubber formula for roller (commercially available from Chunfa Hitech Industrial Co., Ltd., free of PVC, identified by IR) was hot-pressed and vulcanized at 150° C. for 20 minutes by a hot press machine to obtain a sheet. The sheet was cracked to obtain scraps of waste nitrile rubber with a diameter of about 2 cm. 40 g of the waste nitrile rubber and 3 phr of the depolymerizer (product of Synthesis Example 1) were added into a plastometer (Plasti-corder PL2000) for being depolymerized at 210° C. and 70 rpm for 15 minutes to obtain a recycled rubber. The depolymerization was repeated 3 times to obtain about 120 g of the recycled rubber. The recycled rubber was refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (3.9 MPa) and elongation rate (248%).

TABLE 2

| | Mechanical strength | | Compared to fresh rubber | |
|---|---|---|---|---|
| | Tensile strength (MPa) | Elongation rate (%) | Tensile strength % | Elongation rate % |
| Example 1-1 (fresh rubber) | 9.54 | 480 | 100% | 100% |
| Example 2-1 (0.5 phr depolymerizer) | 3.05 | 186 | 32% | 39% |
| Example 2-2 (1 phr depolymerizer) | 3.26 | 217 | 34% | 45% |
| Example 2-3 (2 phr depolymerizer) | 3.35 | 213 | 35% | 44% |

TABLE 2-continued

| | Mechanical strength | | Compared to fresh rubber | |
|---|---|---|---|---|
| | Tensile strength (MPa) | Elongation rate (%) | Tensile strength % | Elongation rate % |
| Example 2-4 (3 phr depolymerizer) | 3.90 | 248 | 41% | 52% |

Accordingly, the higher addition amount of the depolymerizer could enhance the mechanical strength of the recycled rubber. However, the enhancement effect slowed down as the addition amount increases.

Example 3-1

90 parts of the nitrile rubber formula in Example 1-1 and 10 parts by weight of the recycled rubber in Example 1-2 were refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (8.70 MPa) and elongation rate (409%).

Example 3-2

80 parts of the nitrile rubber formula in Example 1-1 and 20 parts by weight of the recycled rubber in Example 1-2 were refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (8.42 MPa) and elongation rate (401%).

Example 3-3

70 parts of the nitrile rubber formula in Example 1-1 and 30 parts by weight of the recycled rubber in Example 1-2 were refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (8.21 MPa) and elongation rate (403%).

Example 3-4

60 parts of the nitrile rubber formula in Example 1-1 and 40 parts by weight of the recycled rubber in Example 1-2 were refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (7.42 MPa) and elongation rate (353%).

Example 3-5

50 parts of the nitrile rubber formula in Example 1-1 and 50 parts by weight of the recycled rubber in Example 1-2 were refined by double rollers at 40° C. and 30 rpm for 8 minutes to obtain a sheet. 100 g of the sheet was vulcanized by adding vulcanizing agent according to JIS standard (JIS K6313-2012), and the vulcanized sheet was analyzed to measure its tensile strength (7.06 MPa) and elongation rate (360%).

TABLE 3

| | Mechanical strength | | Compared to fresh rubber | |
|---|---|---|---|---|
| | Tensile strength (MPa) | Elongation rate (%) | Tensile strength % | Elongation rate % |
| Example 1-1 (fresh rubber) | 9.54 | 480 | 100% | 100% |
| Example 3-1 (10% recycled rubber) | 8.70 | 409 | 91% | 85% |
| Example 3-2 (20% recycled rubber) | 8.42 | 401 | 88% | 83% |
| Example 3-3 (30% recycled rubber) | 8.21 | 403 | 86% | 84% |
| Example 3-4 (40% recycled rubber) | 7.42 | 353 | 78% | 74% |
| Example 3-5 (50% recycled rubber) | 7.06 | 360 | 74% | 75% |

Accordingly, addition of the recycled rubber would lower the mechanical strength, but still maintain a certain degree to be used again.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A depolymerizer, having a chemical structure of

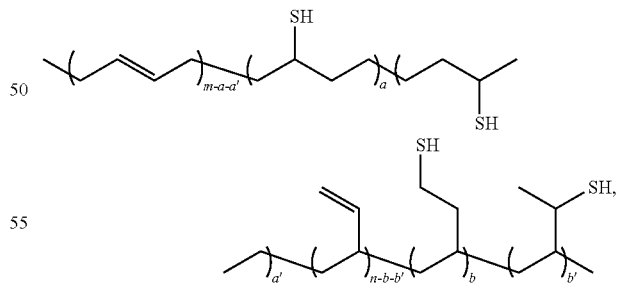

wherein $(a+a'+b+b'):(m+n)=0.01:1$ to $0.67:1$, $a>0$, $a'>0$, $b>0$, and $b'>0$.

2. The depolymerizer as claimed in claim 1, having a weight average molecular weight of 1000 to 400000.

3. A recycled rubber, being formed by depolymerizing 100 parts by weight of rubber using 0.5 to 10 parts by weight of a depolymerizer, wherein the depolymerizer has a chemical structure of

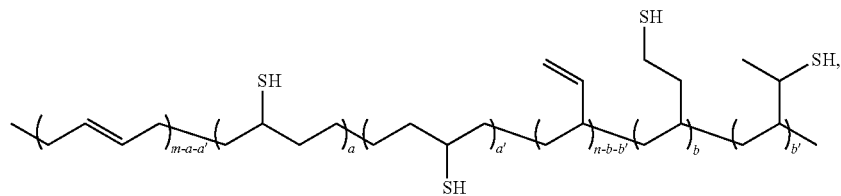

wherein (a+a'+b+b'):(m+n)=0.01:1 to 0.67:1, a'>0 b>0, and b'>0.

4. The recycled rubber as claimed in claim 3, wherein the rubber comprises poly(cis-1,3-butadiene) rubber, polystyrene-butadiene rubber, nitrile rubber, buna rubber, ethylene propylene rubber, butyl rubber, or a combination thereof.

5. The recycled rubber as claimed in claim 3, wherein the depolymerizer has a weight average molecular weight of 1000 to 400000.

* * * * *